(12) United States Patent
Bates et al.

(10) Patent No.: US 7,158,255 B2
(45) Date of Patent: Jan. 2, 2007

(54) METHOD FOR PRINTING SHINGLING PRINT DATA

(75) Inventors: John B. Bates, Harrodsburg, KY (US); Thomas J. Eade, Lexington, KY (US); Mark W. Fagan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 855 days.

(21) Appl. No.: 10/174,351

(22) Filed: Jun. 18, 2002

(65) Prior Publication Data

US 2003/0231362 A1 Dec. 18, 2003

(51) Int. Cl.
G06F 3/12 (2006.01)
G06F 15/00 (2006.01)
G06K 1/00 (2006.01)

(52) U.S. Cl. .................. 358/1.15; 347/41; 347/43; 382/245

(58) Field of Classification Search .............. 347/41, 347/43; 382/245
See application file for complete search history.

(56) References Cited

U.S. PATENT DOCUMENTS

| | | | |
|---|---|---|---|
| 3,728,684 A | 4/1973 | Morganti | |
| 5,249,061 A * | 9/1993 | Nagashima et al. | 358/296 |
| 5,452,405 A | 9/1995 | Vondran, Jr. | |
| 5,506,944 A * | 4/1996 | Gentile | 358/1.15 |
| 5,513,301 A | 4/1996 | Wakasu | |
| 5,555,006 A * | 9/1996 | Cleveland et al. | 347/41 |
| 5,729,668 A | 3/1998 | Claflin et al. | |
| 5,745,255 A | 4/1998 | Yamaguchi | |
| 5,764,865 A | 6/1998 | Masubuchi et al. | |
| 5,841,953 A | 11/1998 | Rohatgi | |
| 5,901,277 A | 5/1999 | Chu et al. | |
| 5,901,278 A | 5/1999 | Kurihara et al. | |
| 5,946,459 A | 8/1999 | Plakosh | |
| 5,963,716 A | 10/1999 | Welborn et al. | |
| 5,978,553 A | 11/1999 | Ikeda | |
| 5,999,709 A | 12/1999 | Fiala et al. | |
| 6,020,975 A | 2/2000 | Chen et al. | |
| 6,038,033 A | 3/2000 | Bender et al. | |
| 6,043,897 A | 3/2000 | Morikawa et al. | |
| 6,082,849 A * | 7/2000 | Chang et al. | 347/43 |
| 6,104,506 A | 8/2000 | Hirokawa | |
| 6,135,653 A | 10/2000 | Aichi | |
| 6,184,997 B1 | 2/2001 | Hanyu et al. | |
| 6,219,716 B1 | 4/2001 | Kumaki | |
| 6,324,305 B1 * | 11/2001 | Holladay et al. | 382/239 |
| 6,483,609 B1 * | 11/2002 | Ueno et al. | 358/434 |

* cited by examiner

*Primary Examiner*—Twyler Lamb
*Assistant Examiner*—Yixing Qin
(74) *Attorney, Agent, or Firm*—Thompson Hine, LLP

(57) ABSTRACT

A method for printing shingling print data in a shingling print pass of a multi-shingling-pass print swath. One step includes compacting the shingling print data by removing the deterministic voids associated with the shingling print algorithm. Another step includes expanding the compacted shingling print data based on the shingling print algorithm. An additional step includes printing the expanded shingling print data.

14 Claims, 4 Drawing Sheets

METHOD FOR PRINTING SHINGLING PRINT DATA

TECHNICAL FIELD

The present invention relates generally to printing, and more particularly to a method for printing shingling print data in a shingling print pass of a multi-shingling-pass print swath.

BACKGROUND OF THE INVENTION

Printers include an inkjet printer having a printhead with print nozzles used to print ink on print media. Typically, print data is generated by a computer and is sent to a printer memory where it is used by the printer to generate a bitmap of how the print nozzles will be fired to deposit ink drops as the printhead moves across the print media. The print media is advanced for the next print swath when the printer is through printing the present print swath. A multi-pass print swath is a print swath printed by two or more print passes (or print scans) of the printhead either before the print media is advanced or with the media being advanced less than the height of a print swath between print passes.

Shingling is an example of multi-pass printing known to those skilled in the art and is used for certain print modes to improve print quality. Shingling is an overlay print process whereby ink droplets are applied to a print medium in a distributed fashion. Print overlay techniques vary with typical shingling print algorithms using two, three, four or six or more print passes (print scans) per print swath to achieve full print coverage. In one known shingling application, the print media is advanced between print passes a distance equal to the print swath height divided by the number of print passes.

One example of two-shingling-pass printing uses a "checkerboard" shingling print algorithm, wherein the first printing pass prints only on the pixel locations of the print media corresponding to the black squares of a checkerboard, and wherein the second printing pass prints only on the pixel locations of the print media corresponding to the red squares of the checkerboard. To do this, the computer sends print data corresponding to the black squares or the red squares of the entire checkerboard to the printer memory for the corresponding print pass, wherein the print data corresponding to the red squares are made to be "don't print" print data for the first print pass and define the deterministic voids in the first print pass, and wherein the print data corresponding to the black squares are made to be "don't print" print data for the second print pass and define the deterministic voids in the second print pass.

What is needed is an improved method for printing shingling print data in a shingling print pass of a multi-shingling-pass print swath.

SUMMARY OF THE INVENTION

A first method of the invention is for printing shingling print data in a shingling print pass of a multi-shingling-pass print swath and includes steps a) through f). Step a) includes generating the shingling print data in a computer. Step b) includes compacting the shingling print data in the computer by removing the deterministic voids associated with the shingling print algorithm. Step c) includes sending an expander control sequence based on the shingling print algorithm to the printer from the computer, wherein the expander control sequence includes a map of the expanded print placement of each of the data bits present in the compacted shingling print data. Step d) includes sending the compacted shingling print data to the printer. Step e) includes expanding the compacted shingling print data in the printer in accordance with the expander control sequence. Step f) includes printing the expanded shingling print data using the printer without having stored the expanded shingling print data in the printer.

A second method of the invention is for printing shingling print data in a shingling print pass of a multi-shingling-pass print swath and includes steps a) through d). Step a) includes compacting the shingling print data in a computer by removing the deterministic voids associated with the shingling print algorithm. Step b) includes sending the compacted shingling print data to a printer. Step c) includes expanding the compacted shingling print data in the printer based on the shingling print algorithm. Step d) includes printing the expanded shingling print data using the printer.

A third method of the invention is for printing shingling print data in a shingling print pass of a multi-shingling-pass print swath and includes steps a) through c). Step a) includes compacting the shingling print data by removing the deterministic voids associated with the shingling print algorithm. Step b) includes expanding the compacted shingling print data based on the shingling print algorithm. Step c) includes printing the expanded shingling print data.

Several benefits and advantages are derived from one or more of the methods of the invention. By taking into account the deterministic voids in a shingling print pass of a multi-shingling-pass print swath, in one example, the deterministic voids can be removed by the computer to send compacted shingling print data to the printer which reduces data traffic on the communication link between the computer and the printer. In one variation of the example, required printer memory size is reduced to that sufficient for the compacted shingling print data. Reduced memory size lowers cost. In this variation, the deterministic voids are taken into account to expand the compacted shingling print data in the printer and to print the expanded shingling print data without having to store a bitmap of the expanded shingling print data in the printer memory.

DETAILED DESCRIPTION

Figure 1:
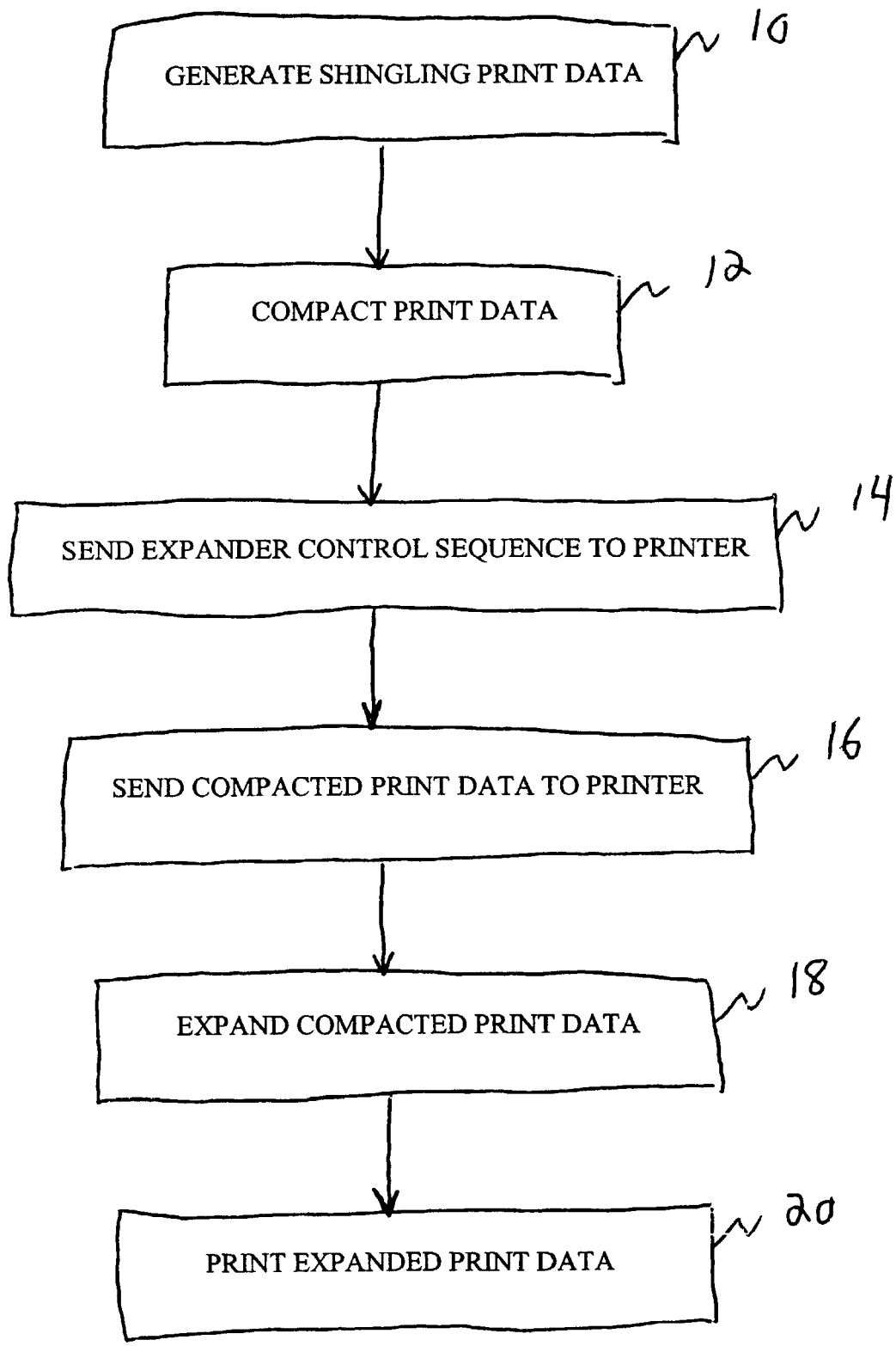
FIG. 1 is a block diagram of a first method of the invention.

A first method of the invention is for printing shingling print data in a shingling print pass of a multi-shingling-pass print swath. The first method is shown in block diagram form in FIG. 1 and includes steps a) through f). Step a) is labeled as "Generate Shingling Print Data" in block 10 of FIG. 1. Step a) includes generating the shingling print data in a computer. Step b) is labeled as "Compact Print Data" in block 12 of FIG. 1. Step b) includes compacting the shingling print data in the computer by removing the deterministic voids associated with the shingling print algorithm. Step c) is labeled as "Send Expander Control Sequence To Printer" in block 14 of FIG. 1. Step c) includes sending an expander control sequence based on the shingling print algorithm to the printer from the computer, wherein the expander control sequence includes a map of the expanded print placement of each of the data bits present in the compacted shingling print data. Step d) is labeled as "Send Compacted Print Data To Printer" in block 16 of FIG. 1. Step d) includes sending the compacted shingling print data to the printer. Step e) is labeled as "Expand Compacted Print Data" in block 18 of FIG. 1. Step e) includes expanding the compacted shingling print data in the printer in accordance with the expander control sequence. Step f) is labeled as "Print Expanded Print Data" in block 20 of FIG. 1. Step f) includes printing the expanded shingling print data using the printer without having stored the expanded shingling print data in the printer.

In one enablement of the first method, step d) sends the compacted shingling print data to a memory of the printer having a size which is insufficient for storing the shingling print data of step a).

In one example of the first method, only one shingling print algorithm is used for the shingling print pass. In one variation, only one shingling print algorithm is used for the print swath. In one modification, only one shingling print algorithm is used by the printer.

In another example of the first method, the shingling print algorithm includes a first algorithm for a first portion of the shingling print pass and includes a second algorithm for a second portion of the shingling print pass, wherein the second algorithm is different than the first algorithm. In one application, the first portion includes graphics print data wherein the first algorithm has a higher number of shingling print passes for the print swath, and the second portion includes text print data wherein the second algorithm has a lower number of shingling print passes for the print swath. In one variation, the first algorithm is used for the first print pass and the second algorithm is used for the second print pass. In one modification, the first algorithm is used for the first print swath and the second algorithm is used for the second print swath.

In one implementation of the first method, step e) uses a multiplexer. In one variation, the output of the multiplexer is used to fire print nozzles of the printer. In one modification, the printer is an inkjet printer.

In another implementation of the first method, step e) uses a serial shift register. In one variation, the output of the serial shift register is used to fire print nozzles of the printer. In one modification, the printer is an inkjet printer.

In one application of the first method, the number of shingling print passes in the print swath is N, the number of pixels in the print swath height is P, and the expander control sequence includes a repeating pattern of P times N single-digit binary numbers. In one variation, the binary numbers are grouped starting with the first P binary numbers defining the first group and ending with the last P binary numbers defining the Nth group. In one modification, the starting group of the expander control sequence in step e) rotates starting with the first group as the starting group for the first shingling print pass and ending with the Nth group as the starting group for the Nth shingling print pass.

Figure 2:
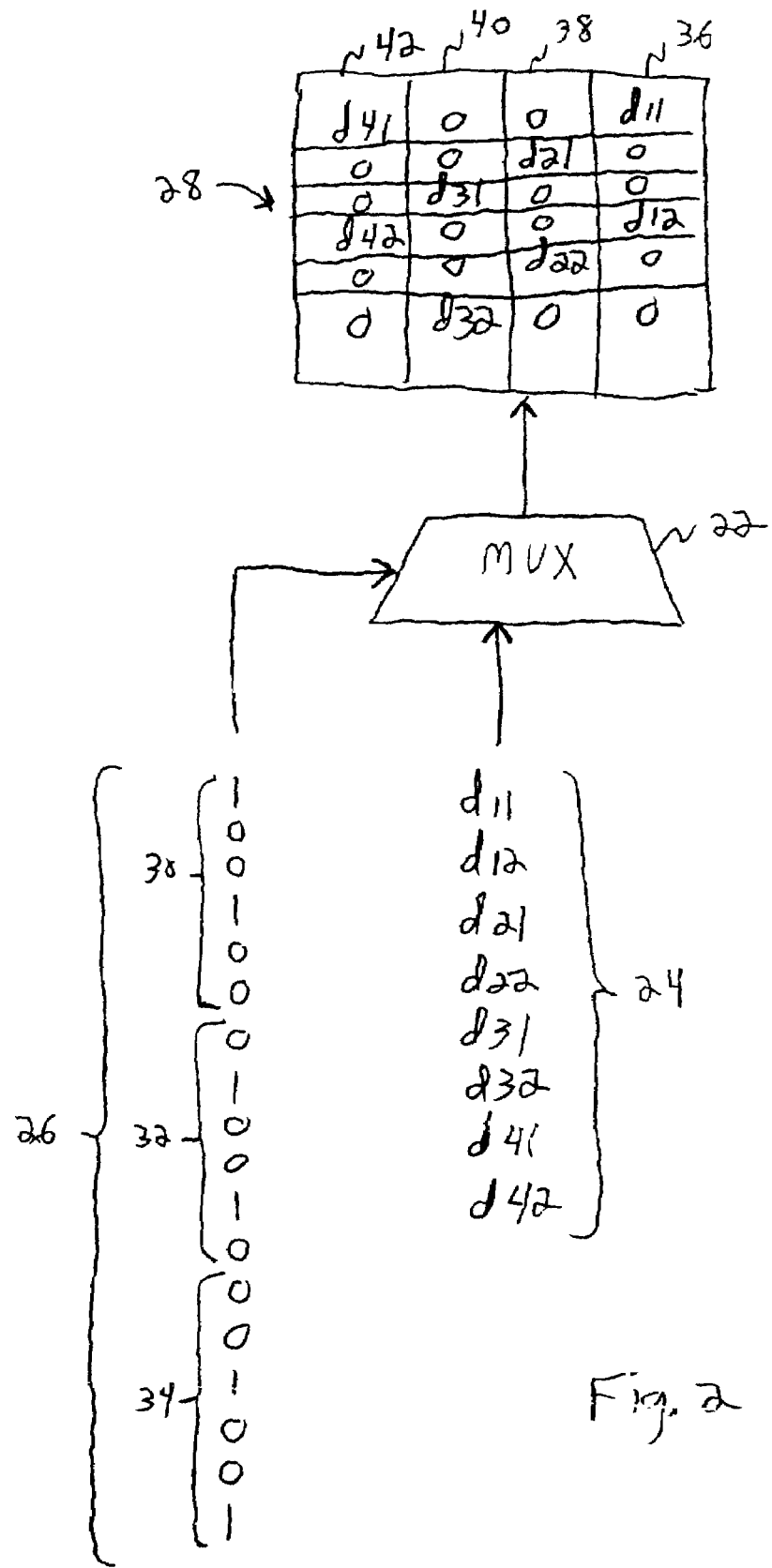
FIG. 2 is an explanatory diagram of how a multiplexer uses an expander control sequence to direct the expanded print placement of each of the data bits present in the compacted shingling print data for the first four pixel columns of the first shingling pass of a three-shingling-pass print swath having a height of six pixels.

In a first illustration of the first method, step e) uses a multiplexer 22 as shown in FIG. 2 to input the compacted shingling print data 24 and the expander control sequence 26 and to output firing commands to the print nozzles of a printhead which has moved from right to left having printed an output print image 28 on the print media. In the output print image 28, "dxx" represents a printable data bit which has been printed in this illustration, "0" represents a non-printable pixel location of the image, and an imaginary pixel box is shown surrounding each "dxx" and "0". The image 28 is of the first four pixel columns of the first shingling print pass of a three-shingling-pass print swath having a swath height of six pixels (corresponding to a printhead having six vertically-spaced print nozzles). In operation, the compacted shingling print data is inputted into the multiplexer 22 in the following sequence: d11, d12, d21, d22, d31, d32, d41, d42.

In this illustration, the expander control sequence 26 is shown as including a first group 30, a second group 32, and a third group 34. The first group 30 is inputted into the multiplexer 22 in the following sequence: 1,0,0,1,0,0. The second group 32 is inputted into the multiplexer 22 in the following sequence: 0,1,0,0,1,0. The third group 34 is inputted into the multiplexer 22 in the following sequence: 0,0,1,0,0,1. The first group 30 is the starting group which first enters the multiplexer 22, followed by the second and then the third group, for the first (right-to-left) shingling print pass.

In this illustration, as the printhead reaches the first pixel column 36 of where the image 28 is to be printed on the print media, the multiplexer 22: associates (through mapping circuits which are within the level of skill of the artisan) print data bit d11 with the first encountered "1" in the first group 30 of the expander control sequence 26 which corresponds to the first (top) print nozzle of the printhead; associates print data bit d12 with the second encountered "1" in the first group 30 of the expander control sequence 26 which corresponds to the fourth (from the top) print nozzle of the printhead; causes the first nozzle to fire, in this illustration, if d11 is a "1" corresponding to a "print" data bit; and causes the fourth print nozzle to fire if d12 is a "1" corresponding to a "print" data bit. In the first pixel column 36 of the image 28, d11 and d12 are shown indicating printable pixel locations (which have been printed in this illustration) and the "0's" are shown indicating unprintable and unprinted pixel locations.

Then, as the printhead reaches the second pixel column 38 of where the image 28 is to be printed, the multiplexer 22: associates d21 with the first encountered "1" in the second group 32 of the expander control sequence 26 which corresponds to the second (from the top) print nozzle of the printhead; associates print data bit d22 with the second encountered "1" in the second group 32 of the expander control sequence 26 which corresponds to the fifth (from the top) print nozzle of the printhead; and causes d21 and d22 to be printed in the second pixel column 38 as shown in FIG. 2.

Then, as the printhead reaches the third pixel column 40 of where the image 28 is to be printed, the multiplexer 22: associates d31 with the first encountered "1" in the third group 34 of the expander control sequence 26 which corresponds to the third (from the top) print nozzle of the printhead; associates print data bit d32 with the second encountered "1" in the third group 34 of the expander control sequence 26 which corresponds to the bottom print nozzle of the printhead; and causes d31 and d32 to be printed in the third pixel column 40 as shown in FIG. 2.

The expander control sequence 26 repeats after each set of three pixel columns of the image is printed. Thus, d41 and d42 are placed in the fourth pixel column 42 of the print image 28 in an identical manner to the placement of d11 and d12 in the first pixel column 36 of the print image 28, etc.

The starting group of the three groups of the expander control sequence 26 rotates for subsequent (right-to-left) print passes of the three-shingling-pass print swath. Thus, the second group 32 is the starting group which first enters the multiplexer 22, followed by the third and then the first group, for the second shingling print pass. Likewise, the third group 34 is the starting group which first enters the multiplexer 22, followed by the first and then the second group, for the third shingling pass. In this way, after three shingling print passes all pixel print locations of the image will be printed (assuming all pixel print locations call for printed data). It is within the level of skill of the artisan to modify the first, second and/or third group 30, 32 and/or 34 to accommodate left-to-right printing by the printhead or to accommodate bi-directional printing by the printhead.

It is noted that the invention is not limited to the particular shingling print algorithm illustrated for a three-shingling-pass print swath and is not limited to a shingling print algorithm for a three-shingling-pass print swath. The invention is equally applicable to other shingling print algorithms for a three-shingling-pass print swath and to other shingling print algorithms for a two, four, etc. shingling-pass print swath as can be appreciated by those skilled in the art. Likewise, the invention is not limited to using a multiplexer in step e) and is not limited to a particular print swath height, as can be appreciated by the artisan.

In one variation of the first illustration of the first method, step e) also uses a barrel shifter (not shown). In this variation, the expander control sequence data initially look like the data of the first group 30. The barrel shifter then sends a copy of the initial data to the multiplexer 22. Then, the barrel shifter shifts the bottom bit (in this case a "0") of its data to the top of its data so that the data of the barrel shifter look like the data of the second group 32. The barrel shifter then sends a copy of the once-shifted data to the multiplexer 22. Then, the barrel shifter shifts the bottom bit (in this case also a "0") of its data to the top of its data so that the data of the barrel shifter look like the data of the third group 34. The barrel shifter then sends a copy of the twice-shifted data to the multiplexer 22. The barrel shifter continues to shift and send, as can be appreciated by the artisan.

In another illustration of the first method, step e) uses a serial shift register (not shown) in place of the multiplexer 22. When a binary "1" is present in the expander control sequence 26, the incoming compacted shingling print data is shifted into the output. When a binary "0" is present in the expander control sequence 26, the binary "0" is shifted directly into the output and the incoming data is held up awaiting the next binary "1" in the expander control sequence 26. It is noted that using a serial shift register in step e) results in a smaller hardware circuit and a slower speed than using a multiplexer in step e).

Figure 3:
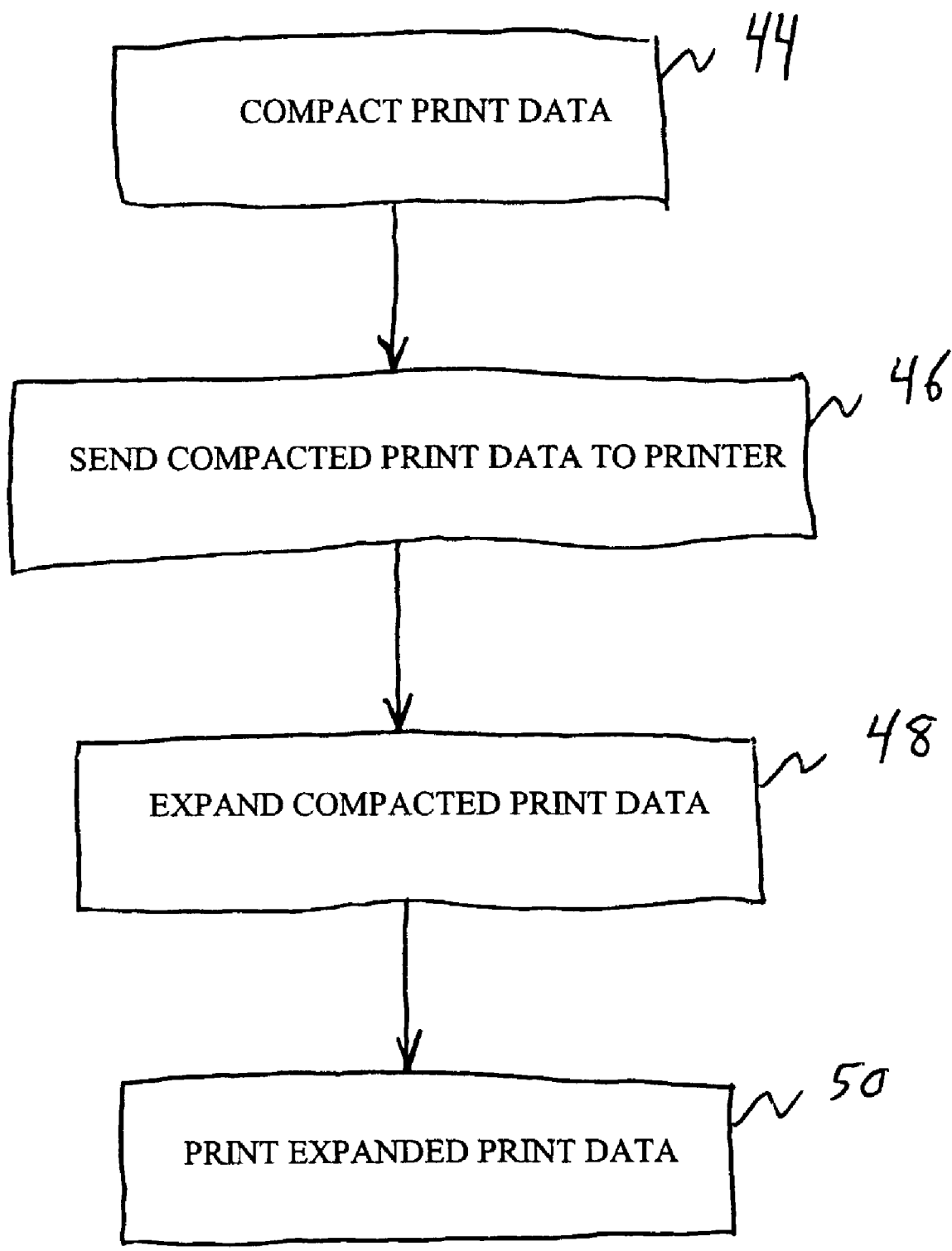
FIG. 3 is a block diagram of a second method of the invention.

A second method of the invention is for printing shingling print data in a shingling print pass of a multi-shingling-pass print swath. The second method is shown in block diagram form in FIG. 3 and includes steps a) through d). Step a) is labeled as "Compact Print Data" in block 44 of FIG. 3. Step a) includes compacting the shingling print data in a computer by removing the deterministic voids associated with the shingling print algorithm. Step b) is labeled as "Send Compacted Print Data To Printer" in block 46 of FIG. 3. Step b) includes sending the compacted shingling print data to a printer. Step c) is labeled as "Expand Compacted Print Data" in block 48 of FIG. 3. Step c) includes expanding the compacted shingling print data in the printer based on the shingling print algorithm. Step d) is labeled as "Print Expanded Print Data" in block 50 of FIG. 3. Step d) includes printing the expanded shingling print data using the printer.

In one example of the second method, step b) sends the compacted shingling print data to a memory of the printer having a size which is insufficient for storing the expanded shingling print data of step c). In one variation, the printer is an inkjet printer. In the same or a different example, the shingling print algorithm is resident in the printer or has been inputted into the printer other than from the source sending the compacted shingling print data to the printer. In the same or a different example, step d) includes printing the expanded shingling print data using the printer either after first having stored the expanded shingling print data in the printer or without first having stored the expanded shingling print data in the printer.

Figure 4:
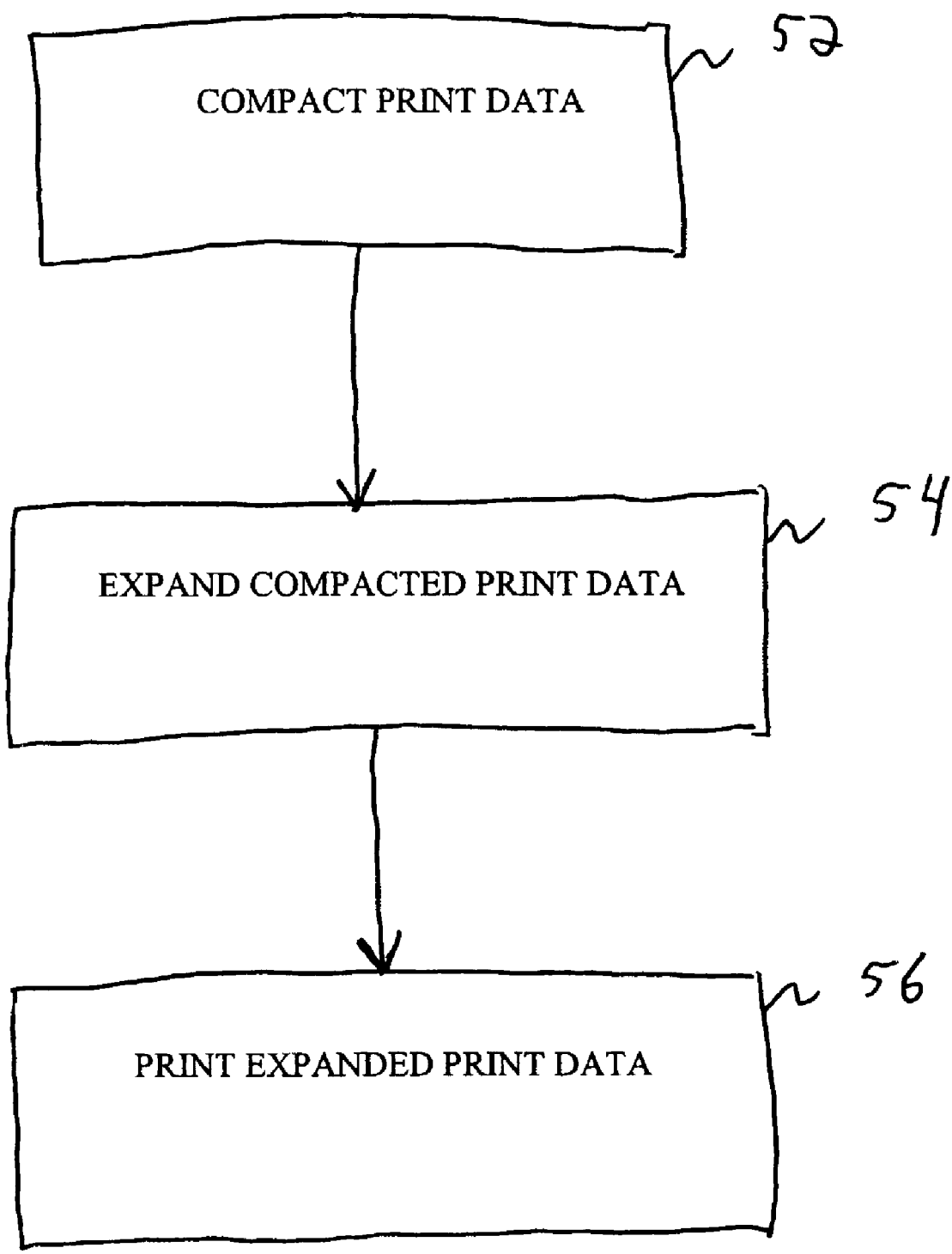
FIG. 4 is a block diagram of a third method of the invention.

A third method of the invention is for printing shingling print data in a shingling print pass of a multi-shingling-pass print swath. The third method is shown in block diagram form in FIG. 4 and includes steps a) through c). Step a) is labeled as "Compact Print Data" in block 52 of FIG. 4. Step a) includes compacting the shingling print data by removing the deterministic voids associated with the shingling print algorithm. Step b) is labeled as "Expand Compacted Print Data" in block 54 of FIG. 4. Step b) includes expanding the compacted shingling print data based on the shingling print algorithm. Step c) is labeled as "Print Expanded Print Data" in block 56 of FIG. 4. Step c) includes printing the expanded shingling print data.

In one example of the third method, step a) is performed by a computer and steps b) and c) are performed by a printer. In one variation, the printer is an inkjet printer. In another example, a single device has a computing portion and a printing portion, wherein the computing portion performs step a) and wherein the printing portion performs steps b) and c). Other examples are left to the artisan.

An extended first, second and third method uses a single-pass print swath for printing when standard data compression techniques can compress the print data to fit a buffer memory in the printer or printing portion of the device. The extended first, second and third method uses a multi-shingling-pass print swath for printing in accordance with the corresponding method of the previously-disclosed first, second and third methods when standard data compression cannot compress the print data to fit the buffer memory. In one example, the buffer memory is large enough to hold one half the data contained in a full density print pass. In this example, a standard data compression technique is applied to the print data and the result measured to determine whether or not the compression was sufficient to fit into the buffer memory space. If the compression achieved at least a 2:1 ratio, the print data will fit the buffer memory and the print data is printed using a single pass print methodology. If the result of the compression is less than 2:1, a shingling print algorithm is used for a two shingling-pass print swath and the print data is printed in a two-shingling-pass fashion in accordance with any of the previously-disclosed first, second and third methods. Other examples are left to the artisan.

Several benefits and advantages are derived from one or more of the methods of the invention. By taking into account the deterministic voids in a shingling print pass of a multi-shingling-pass print swath, in one example, the deterministic voids can be removed by the computer to send compacted shingling print data to the printer which reduces data traffic on the communication link between the computer and the printer. In one variation of the example, required printer memory size is reduced to that sufficient for the compacted shingling print data. Reduced memory size lowers cost. In this variation, the deterministic voids are taken into account to expand the compacted shingling print data in the printer and to print the expanded shingling print data without having to store a bitmap of the expanded shingling print data in the printer memory.

The foregoing description of several methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

What is claimed is:

1. A method for printing shingling print data in a shingling print pass of a multi-shingling-pass print swath comprising the steps of:
   a) generating the shingling print data in a computer;
   b) compacting the shingling print data in the computer by removing deterministic voids associated with the shingling print algorithm;
   c) sending an expander control sequence based on the shingling print algorithm to the printer from the computer, wherein the expander control sequence includes a detailed map of the expanded print placement of each of the data bits present in the compacted shingling print data;
   d) sending the compacted shingling print data to the printer;
   e) expanding the compacted shingling print data in the printer in accordance with the expander control sequence; and
   f) printing the expanded shingling print data using the printer without having stored the expanded shingling print data in the printer.

2. The method of claim 1, wherein only one shingling print algorithm is used for the shingling print pass.

3. The method of claim 1, wherein the shingling print algorithm includes a first algorithm for a first portion of the shingling print pass and includes a second algorithm for a second portion of the shingling print pass, and wherein the second algorithm is different than the first algorithm.

4. The method of claim 1, wherein step e) uses a multiplexer.

5. The method of claim 4, wherein step e) also uses a barrel shifter.

6. The method of claim 4, wherein the output of the multiplexer is used to fire print nozzles of the printer.

7. The method of claim 6, wherein the printer is an inkjet printer.

8. The method of claim 1, wherein step e) uses a serial shift register.

9. The method of claim 8, wherein the output of the serial shift register is used to fire print nozzles of the printer.

10. The method of claim 9, wherein the printer is an inkjet printer.

11. The method of claim 3, wherein the number of shingling print passes in the print swath is N, wherein the number of pixels in the print swath height is P, and wherein the expander control sequence includes a repeating pattern of P times N single-digit binary numbers.

12. The method of claim 11, wherein the binary numbers are grouped starting with the first P binary numbers defining the first group and ending with the last P binary numbers defining the Nth group.

13. The method of claim 12, wherein the starting group of the expander control sequence in step e) rotates starting with the first group as the starting group for the first shingling print pass and ending with the Nth group as the starting group for the Nth shingling print pass.

14. The method of claim 1, wherein step d) sends the compacted shingling print data to a memory of the printer having a size which is insufficient for storing the shingling print data of step a).

* * * * *